R. C. CASHNER.
TOY VEHICLE.
APPLICATION FILED AUG. 11, 1919.
1,394,275.
Patented Oct. 18, 1921.
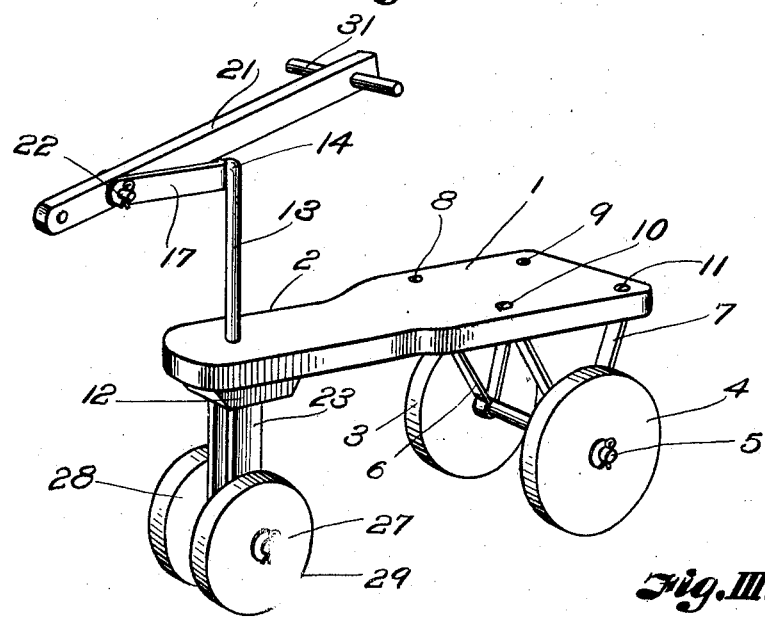
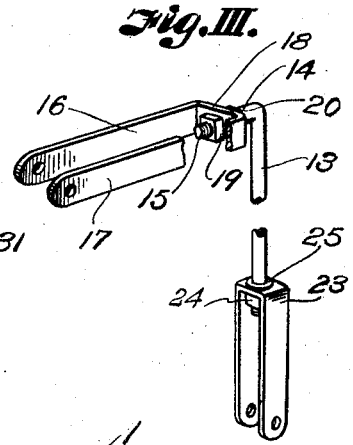
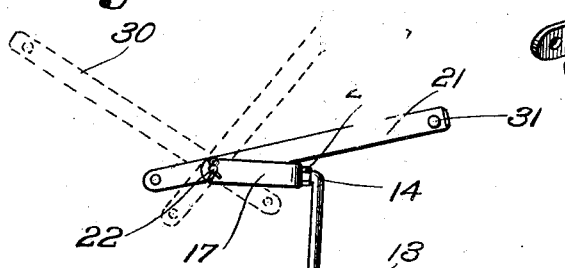
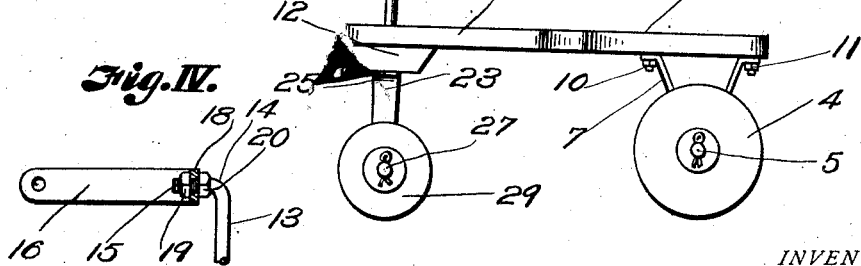
INVENTOR
Roy C. Cashner.
BY Arthur C. Brown
ATTORNEY

UNITED STATES PATENT OFFICE.

ROY C. CASHNER, OF KANSAS CITY, MISSOURI, ASSIGNOR TO LE GRAND B. LEWIS, OF KANSAS CITY, MISSOURI.

TOY VEHICLE.

1,394,275.  Specification of Letters Patent.  Patented Oct. 18, 1921.

Application filed August 11, 1919. Serial No. 316,644.

*To all whom it may concern:*

Be it known that I, ROY C. CASHNER, a citizen of the United States, residing at Kansas City, in the county of Jackson and State of Missouri, have invented certain new and useful Improvements in Toy Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to "toy vehicles" and one of the objects thereof is to provide a vehicle suitable for juveniles adapted to be propelled by pedaling but capable of being utilized as a "coaster" or on occasion, to be propelled by pulling.

In the drawings:

Figure I is a perspective view of a device constructed in accordance with my invention. Fig. II is a side elevational view of the same. Fig. III is a detailed perspective view of the combined propelled mechanism and steering wheel support and Fig. IV is a sectional view through the tongue supporting bracket to show the manner of securing same to the steering rod.

Referring now to the drawings by numerals of reference:

1 designates a seat or body portion, slightly constricted as at 2. The rear wheels 3 and 4 of the vehicle are journaled on axle 5, supported in the brackets 6 and 7, fastened to the seat 1 by the fastening devices 8 and 9 and 10 and 11 respectively. On the forward end of the seat is a reinforcing block 12 and vertically extending through the forward portion of the seat and the block 12 is a rod 13; the upper end of the rod 13 is bent in the form of an elbow 14 to provide a forwardly projecting extension 15 which passes through a loop consisting of the side bars 16 and 17 and the end bar 18. The extension 15 is shown as extending through the bar 18 and fastened thereto by the nuts 19 and 20. Pivoted to the forward free ends of the bar 16 and 17 is a steering handle 21 adapted to swing forwardly and rearwardly on the pivot 22, the purpose of which will be presently explained. The lower end of the rod 13 which extends through the seat 1 and the block 12 is fastened to an inverted U-shaped looped member 23 by a nut 24, there being a washer 25 on the upper side of the transverse bar 26 of said loop. The lower ends of the side bars of the bracket 23 carry an axle 27 on which are mounted the steering wheels 28 and 29 on the outside of the loop or bracket.

When it is desired to propel the vehicle by pedaling along the surface over which the vehicle is to travel, the steering bar will be in the position shown in full lines in Figs. I and II. When, however, it is desired to "coast," the steering handle 21 will be in position shown in dotted line 29, Fig. II so that the operator may stand upon the seat. When the device is to be propelled by pulling, the steering handle will be in the position shown in dotted lines at 30, Fig. II. Thus the occupant may sit upon the seat and the device may be propelled by a second person. The cross bar 31 on the outer end of the steering handle will aid in permitting a proper grasp upon the same.

It will be apparent from the foregoing description when viewed in connection with the accompanying drawing that I have provided a toy vehicle, readily adapted, to be used as a pedal car, as a coaster or to be propelled by pulling and that any adaptation of the device may be changed over to the other instantaneously without any readjustment of the parts.

I claim—

1. In a device of the class described, a seat provided with rear wheels, a rod projecting through the forward part of the seat, an inverted axle-supporting bracket on the lower end of the rod, a laterally projecting portion at the upper end of the rod, a U-shaped member connected to the laterally projecting portion, and a pivoted handle carried by the U-shaped bracket.

2. In a steering means for toy vehicles, an L-shaped rod, a U-shaped member rigidly connected to one end of the rod having axle-receiving openings, a U-shaped member connected to the other end of the rod and at right angles to the first named U-shaped member, and a handle connected to the last named U-shaped member.

In testimony whereof I affix my signature.

ROY C. CASHNER.